United States Patent [19]
Gans et al.

[11] Patent Number: 5,388,088
[45] Date of Patent: Feb. 7, 1995

[54] MULTIPLE POLARIZATION SENSITIVE DETECTION ARRANGEMENT FOR FIBER OPTIC COMMUNICATIONS

[75] Inventors: Michael J. Gans, Monmouth Beach; Sanjay Kasturia; Jack H. Winters, both of Middletown, all of N.J.

[73] Assignee: AT&T Corp., Murray Hill, N.J.

[21] Appl. No.: 862,398

[22] Filed: Apr. 2, 1992

[51] Int. Cl.⁶ ............................................. H04B 10/00
[52] U.S. Cl. .................................. 359/122; 359/156; 359/192
[58] Field of Search .................... 359/122, 156, 192

[56] References Cited

FOREIGN PATENT DOCUMENTS

| | | | |
|---|---|---|---|
| 0314491 | 5/1989 | European Pat. Off. | 359/192 |
| 0144203 | 12/1978 | Japan | 359/122 |
| 0175539 | 7/1988 | Japan | 359/122 |
| 0249818 | 10/1988 | Japan | 359/122 |
| 0118815 | 5/1989 | Japan | 359/122 |
| 0132929 | 5/1990 | Japan | 359/122 |
| 4438128 | 2/1992 | Japan | 359/192 |

OTHER PUBLICATIONS

R. Cross et al., "Polarization Measurement Goes Automatic", Lasers & Optronics, Nov. 1991, p. 25–26.
L. Seto et al., "Coherent Optical Polarization-Shift-Keying (POLSK) Homodyne System Using Phase-Diversity Receivers," IEEE Global Telecomm. Conference, Phoenix, Arizona, Dec. 2–5, 1991, pp. 1601–1605.
R. Clavani et al., "An Experiment Of Optical Heterodyne Transmission With Polarization Modulation At 140 Mbit/s Bitrate And 1550 nm Wavelength", IEEE Global Telecommunications Conference, phoenix, Arizona, Dec. 2–5, 1991, pp. 1587–1591.
S. G. Evangelides, Jr. et al., "Polarization Multiplexing With Solitons", Jour. of Lightwave Technology, vol. 10, No. 1, Jan. 1992, pp. 28–35.
Goedge Buer, "Multiplex communication via E-O phase Modulation of White Light" Optica Acta 1982 vol. 29 #4 pp. 471–477.
Denton, "The Laser and PCM", Bell Labs Record vol. 46, #6, Jun. 1968 pp. 175–179.

*Primary Examiner*—Leslie Pascal
*Attorney, Agent, or Firm*—Gerard A. deBlasi

[57] ABSTRACT

Transmission capacity of an optical fiber is increased by transmitting two optical signals of orthogonal polarizations through the fiber and distinguishing the signals from one another at the receiver by appropriately weighting polarization components representative of the transmitted signals. The weighted polarization components are summed to provide two output electrical signals that are proportional in magnitude to the two transmitted optical signals. Appropriate weighting of the signals eliminates cross-channel interference and maximizes the signal to noise ratio. Signals of arbitrary received polarizations are detected and separated from one another.

22 Claims, 8 Drawing Sheets

MULTIPLE POLARIZATION SENSITIVE DETECTION ARRANGEMENT FOR FIBER OPTIC COMMUNICATIONS

TECHNICAL FIELD

This invention relates to lightwave transmission systems. More particularly, this invention relates to methods and apparatus for recovering data from optical signals transmitted in different polarizations over the same transmission medium.

BACKGROUND OF THE INVENTION

Demand for bandwidth in lightwave communication systems is ever increasing. This increasing demand can be met by installing additional fiber cable. However, augmentation of existing long distance fiber systems is costly. Thus, it is desirable to use existing systems to maximum capacity.

One technique for increasing the capacity of an existing fiber system is a form of space division multiplexing in which two optical signals of different polarizations are transmitted through a single optical fiber. Transmission of different data sequences in the same fiber via a separate polarization for each sequence permits more information to pass through the fiber without increasing the bit rate in any particular polarization. But, it is difficult to discriminate between two signals of different polarizations because polarizations that are easily distinguishable when the signals are transmitted become indistinguishable when the signals are received because of polarization rotation and distortion. For example, polarization mode dispersion and nonlinear effects, such as cross-phase modulation and four-photon mixing, induce phase changes and power dependent distortion in the polarized optical signals as the signals pass through the fiber. This, in turn, makes the two interfering optical signals difficult to distinguish from each other. Inability to distinguish between the signals arises because components of the optical signal in one polarization are sufficiently distorted to appear in the optical signal of the other polarization and vice versa. There is no mechanism within prior art receivers to intelligently extract unwanted components from each received optical signal so that the original data signals can be separated during recovery.

Special receivers equipped with polarization controllers, such as lithium niobate (LiNbO3) polarization controllers or mechanically adjustable bulk optical components, were used in the prior art to correct polarization rotation experienced by an optical signal. Polarization controllers adjusted an incoming arbitrary polarization to match the needed polarization at the receiver. However, receivers using polarization controllers are complex and reliability is a concern. Polarization controllers also are slow to adjust to different polarizations. For example, mechanically adjustable components are physically rotated and repositioned to detect different polarizations. Lithium niobate polarization controllers require the application of large voltages to detect different polarizations. Moreover, dispersive and nonlinear effects for fibers and the differences in these effects on the different axes of the fiber cause optical signals transmitted in separate "non-interfering" polarizations to suffer mutually induced distortion and cross-talk, thereby making separation and extraction of data sequences modulated on the optical signals unwieldy at best and perhaps even impossible when the cross-talk is too high. Thus, a polarization controller may be able to adjust the polarization of one of the two optical signals to correct polarization distortion in that signal, but the polarization controller may not correct polarization distortion in the second signal and cannot reduce cross-talk between the first and second signals. As a result, space division multiplexing using different polarizations is difficult and may not be practically realizable in many cases using present receiver and polarization controller technology.

SUMMARY OF THE INVENTION

A distinct set of polarization components are derived and processed for each received data signal to permit extraction of substantially uncorrupted representations of the original data signals. Optical signals of different polarizations that are received from a single optical fiber are distinguished from one another by separating the output of the optical fiber into different optical polarization components and processing the polarization components to generate two output signals. The output signals are proportional in magnitude to the two received optical signals and are free of cross-channel interference.

In a preferred embodiment of the invention, multiple fixed polarization filters split the two received optical signals into four polarization components, each of the polarization components being a composite of the two received optical signals. Four photodetectors convert a respective one of the four polarization components into electrical signals. The electrical signals are appropriately weighted and combined to produce two output signals.

DETAILED DESCRIPTION

The polarization of an optical signal transmitted through a fiber can be determined uniquely by the combination of at least four polarization components of the signal. For example, the polarization of an optical signal can be determined uniquely from the combination of the following polarization components: horizontal linear (h), 45 degree linear (f), and right-hand circular (r), and left-hand circular (l). Given this, we have realized that two optical signals of different and arbitrary polarizations may be transmitted in a single optical fiber and distinguished from one another at a receiver in accordance with the principles of the present invention by detecting and processing for each optical signal four polarization components whose combination uniquely determines the polarization of that signal. As described below, the polarization components are processed to generate the electrical output signals $V_1$ and $V_2$. Output signals $V_1$ and $V_2$ are proportional to the first and second received optical signals, respectively, and are free of cross-channel interference. Output signals $V_1$ and $V_2$ can be used to implement various polarization-dependent data transmission techniques, examples of which will be described below.

Figure 1:
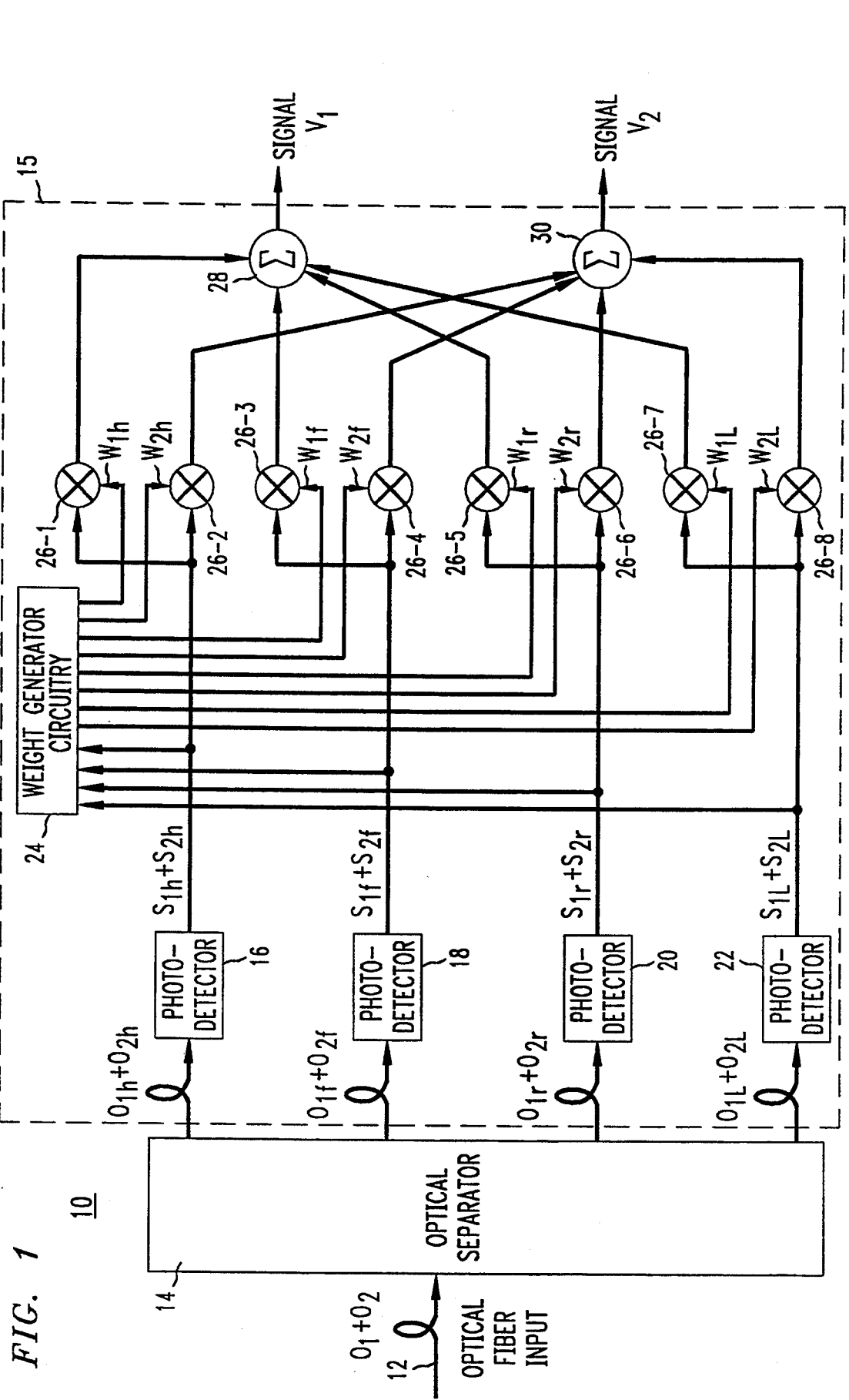
FIG. 1 is a block diagram of an illustrative apparatus for separating two optical signals of different polarization in accordance with the principles of the present invention.

FIG. 1 shows an exemplary polarization receiver arrangement 10 constructed in accordance with the principles of the present invention. Receiver 10 includes an optical separator arrangement 14 and processing means 15. Processing means 15 includes photodetectors 16, 18, 20, and 22, weight generator circuitry 24, attenuators 26-1 through 26-8 (also collectively referred to as attenuators 26), and adders 28 and 30. In a preferred embodiment, all elements in the data path following optical separator 14 are integrated into a single optoelectronic integrated circuit, thus further increasing the reliability and decreasing the cost of receiver 10.

Optical separator 14 separates first and second optical signals $O_1$ and $O_2$ output from optical fiber input 12 into four polarization components: horizontal linear (including $O_{1h}$ and $O_{2h}$), 45 degree linear ($O_{1f}$ and $O_{2f}$), right-hand circular ($O_{1r}$ and $O_{2r}$), and left-hand circular ($O_{1l}$ and $O_{2l}$). Optical separator 14 outputs these polarization components to photodetectors 16, 18, 20, and 22, respectively, of processing means 15. It should be understood that the two optical signals $O_1$ and $O_2$ could be transmitted at different times, as illustrated below in the discussion of polarization switching.

Each photodetector converts a respective one of the optical polarization components into an electrical signal that is proportional to the optical signal incident on that detector. The output of each photodetector is provided to a pair of attenuators 26 associated with that photodetector and weight generator circuitry 24. Thus, each pair of attenuators 26 receives an electrical signal corresponding to a different polarization component. For example, photodetector 16 outputs to attenuators 26-1 and 26-2 an electrical signal proportional to the horizontal linear polarization components of the received optical signals. Similarly, photodetector 18 outputs to attenuators 26-3 and 26-4 an electrical signal proportional to the 45 degree linear polarization components of the received optical signals.

Weight generator circuitry 24, as will be described below, determines an appropriate weighting vector to be applied by attenuators 26 to the respective polarization components received by each attenuator. For example, as shown in FIG. 1, weight generator circuitry 24 outputs weighting signals $W_{1h}$ and $W_{2h}$ to attenuators 26-1 and 26-2, respectively. Attenuators 26 may be implemented as variable gain amplifiers, multipliers, or other similar attenuating means.

Attenuators 26-1, 26-3, 26-5, and 26-7 output to adder 28 the weighted polarization components (h, f, r, and l) that are to be combined to generate output signal $V_1$. Attenuators 26-2, 26-4, 26-6, and 26-8 output to adder 30 the weighted polarization components that are to be combined to generate output signal $V_2$. Signals $V_1$ and $V_2$ are proportional to optical signals $O_1$ and $O_2$, respectively.

Although processing means 15 has been described in the content of a receiver that weights polarization components to distinguish between two polarizations, it is also within the scope of the present invention to distinguish between polarizations by processing the polarization components using conventional non-linear processing techniques. One example of a suitable non-linear processing technique is maximum likelihood detection. Such non-linear processing techniques are particularly well-suited for processor-based implementations of the invention, as will be apparent to one skilled in the art in view of this disclosure.

Figure 2:
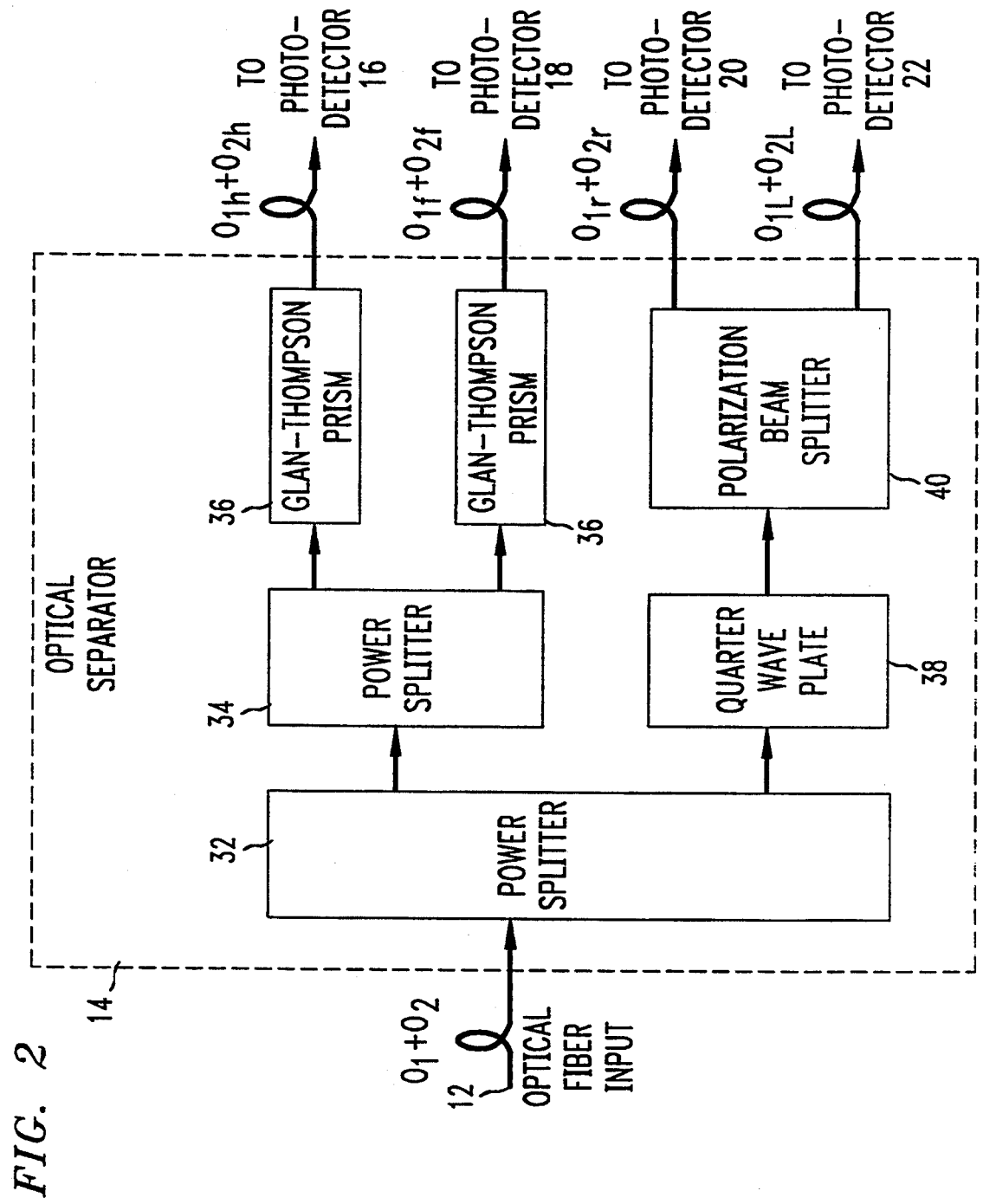
FIG. 2 is a block diagram of an illustrative embodiment of the optical separator of FIG. 1.

FIG. 2 shows an illustrative embodiment of optical separator 14. Optical separator 14 includes multiple fixed polarization filters which separate optical signals output from optical fiber input 12 into predetermined polarization components. Because optical separator 14 includes only fixed optical components, receiver 10 may be constructed more reliably and with less complexity than a receiver constructed with adaptive optical components.

With reference to FIG. 2, optical separator 14 includes two power splitters 32 and 34, Glan-Thompson prisms 36, a quarter wave plate 38, and a polarization beam splitter 40. Power splitter 32 divides the optical signals output from input optical fiber 12 into two components. A first component is input to a second power splitter 34 and a second component is output to quarter wave plate 38. Power splitter 34 further divides the optical signals passing through it into two components. Two Glan-Thompson prisms 36 output the horizontal and 45 degree polarization components of the optical signals to photodetectors 16 and 18 of FIG. 1, respectively. Quarter wave plate 38 converts the right-hand and left-hand circular polarization components of the signals from optical fiber 12 into a linear representation of those components. Polarization beam splitter 40 then separates the right hand circular polarization component front the left hand circular polarization component and outputs the separated components to photodetectors 20 and 22 of FIG. 1, respectively.

Figure 3:
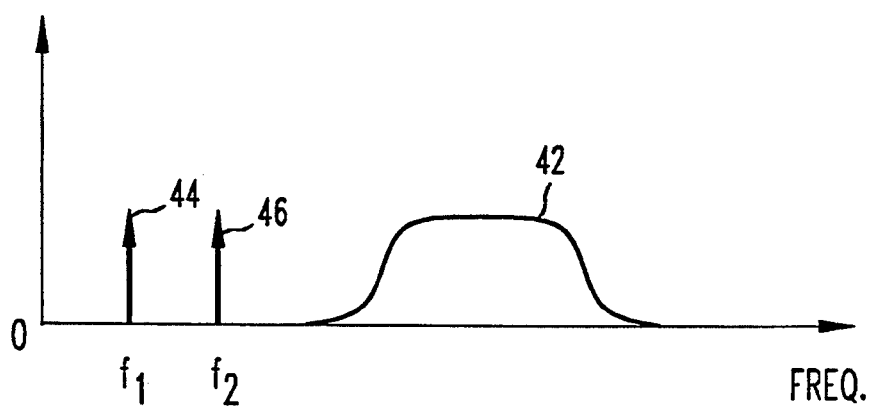
FIG. 3 is a graph of the frequencies of pilot and data signals in an illustrative embodiment of the invention.

In the present illustrative embodiment of the invention, pilot signals (vectors) are used to determine the appropriate weighting signals to be applied by attenuators 26 to the four polarization components. Each of optical signals $O_1$ and $O_2$, transmitted through optical fiber 12 to receiver 10, is modulated by a low frequency pilot signal $P_1$ and $P_2$, respectively, and by a data signal $S_1$ and $S_2$, respectively. The pilot signals, shown in FIG. 3, are of different frequencies from each other and from data signals $S_1$ and $S_2$ (indicated by reference number 42). A first pilot signal 44 is transmitted with a frequency $f_1$ and a second pilot signal 46 is transmitted with a second frequency $f_2$. Typical frequencies for pilot signals 44 and 46 are between 10–50 kHz. Pilot signal 44 has the same relative strength from each polarization optical detector as does data signal $S_1$, and pilot signal 46 has the same relative strength from each polarization optical detector as does data signal $S_2$.

Figure 4:
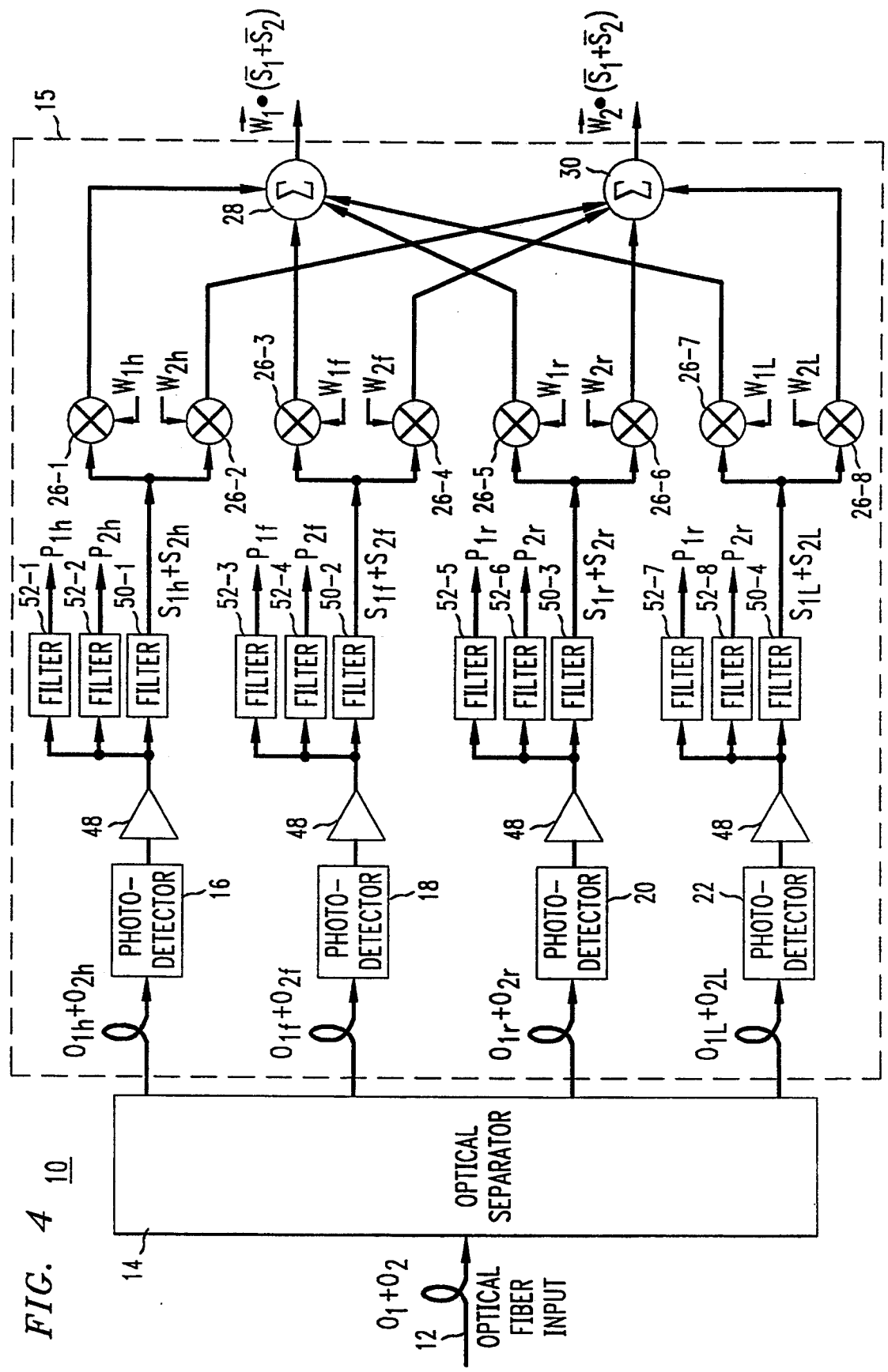
FIG. 4 is block diagram of the apparatus of FIG. 1 showing pilot vector generation circuitry.

FIG. 4 shows the receiver of FIG. 1 in greater detail. The outputs of photodetectors 16, 18, 20, and 22 are amplified by preamplifiers 48 and passed to high pass filters 50-1 through 50-4 and low band pass filters 52-1 through 52-8. The high pass and low band pass filters separate the power incident on each photodetector into three components: the power $P_1$ associated with pilot signal 44, the power $P_2$ associated with pilot signal 46, and the sum of the powers associated with the combined data signals $S_1$ and $S_2$ from optical signals $O_1$ and $O_2$. In particular, low band pass filters 52-1 through 52-8 output the polarization components which correspond to the pilot signals. Low band pass filters 52-1, 52-3, 52-5, and 52-7 each separate the power corresponding to pilot signal 44 ($P_{1h}$, $P_{1f}$, $P_{1r}$, and $P_{1l}$, respectively) from the signal output from its respective detector. Similarly, low band pass filters 52-2, 52-4, 52-6, and 52-8 separate the power corresponding to pilot signal 46 ($P_{2h}$, $P_{2f}$, $P_{2r}$, and $P_{2l}$, respectively). High pass filters 50-1 through 50-4 pass the respective components of $S_1$ and $S_2$.

As described below, the power measurements for the four polarization components of each pilot signal are used by weight generator circuitry 24 to calculate the weighting factors. Because each of the pilot signals is associated with a polarization optical signal that is the same as one of the two data signals, the pilot signal powers $P_1$ and $P_2$ can be used to determine the ratio of power output from each photodetector that is attributable to each of data signals $S_1$ and $S_2$.

The power components of pilot signal 44 ($P_{1h}$, $P_{1f}$, $P_{1r}$, and $P_{1l}$) form the pilot vector $\vec{P}_1$. The power components of the pilot signal 46 ($P_{2h}$, $P_{2f}$, $P_{2r}$, and $P_{2l}$) form the pilot vector $\vec{P}_2$. Components of pilot vectors $\vec{P}_1$ and $\vec{P}_2$ are combined to generate four-component weighting vectors $\vec{W}_1$ and $\vec{W}_2$ according to the formulas:

$$\vec{W}_1 = (\vec{P}_2 \cdot \vec{P}_2)\vec{P}_1 - (\vec{P}_1 \cdot \vec{P}_2)\vec{P}_2;$$

and $$\vec{W}_2 = (\vec{P}_1 \cdot \vec{P}_1)\vec{P}_2 - (\vec{P}_1 \cdot \vec{P}_2)\vec{P}_1$$

Components of $S_1$ and $S_2$ are multiplied by weighting vectors $\vec{W}_1$ and $\vec{W}_2$ using attenuators 26. As previously described, the resulting weighted signals are appropriately combined by adders 28 and 30 to generate two electrical output signals $V_1$ and $V_2$.

Figure 5:
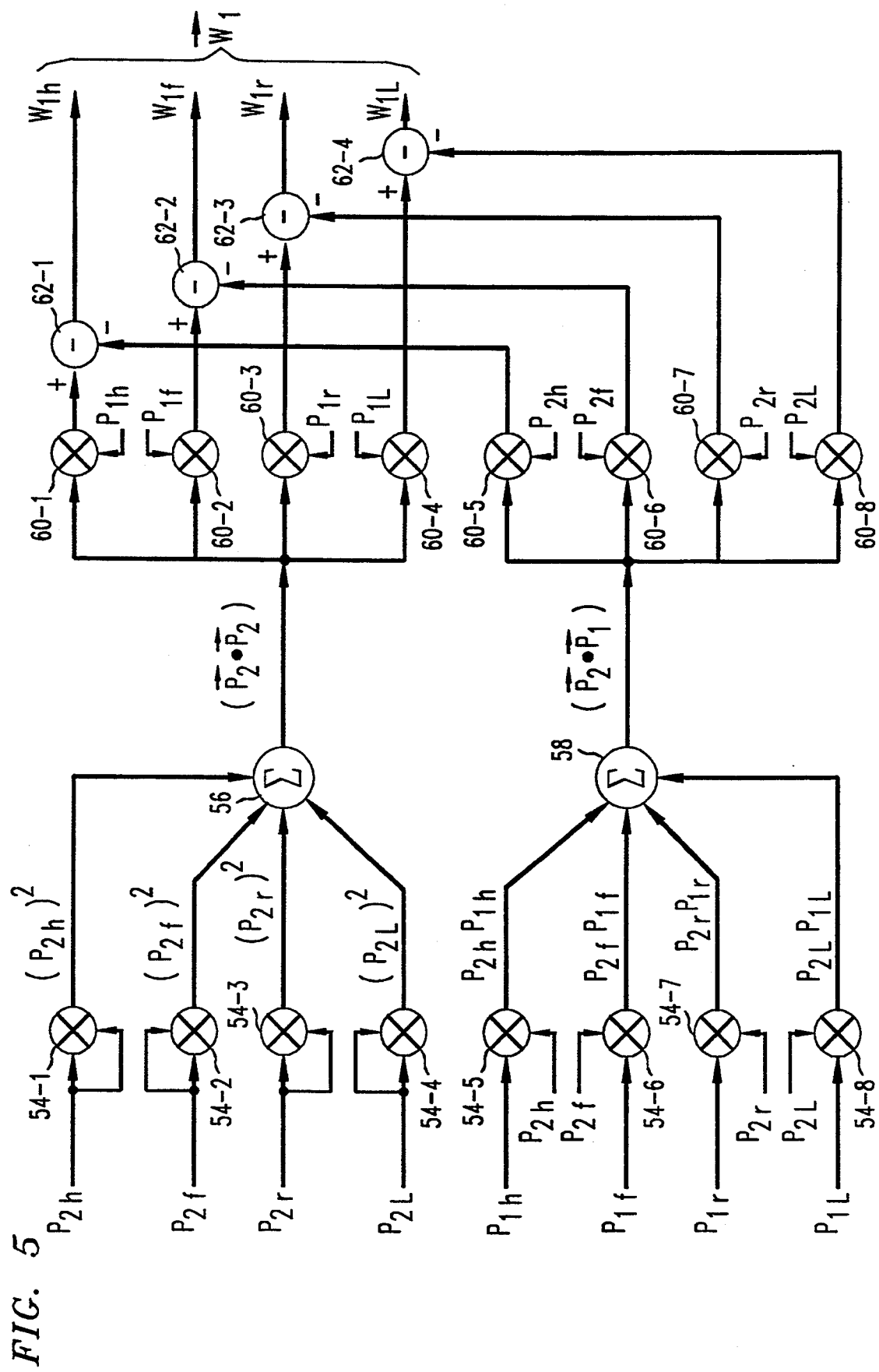
FIG. 5 is a block diagram of an illustrative apparatus for generating weight vectors from pilot vectors.

FIG. 5 shows the circuitry for generating weighting vector $\vec{W}_1$ for signal $S_1$. A similar circuit (not shown) generates weighting vector $\vec{W}_2$ for signal $S_2$. The weight generator circuitry of FIG. 5 includes multipliers 54-1 through 54-8, adders 56 and 58, multipliers 60-1 through 60-8, and subtracters 62-1 through 62-4. The components of weighting vectors $\vec{W}_1$ and $\vec{W}_2$ output from subtracters 62-1 through 62-4 are applied to the appropriate ones of attenuators 26, as discussed above.

With reference to FIG. 5, it is shown that the pilot vector components output from low band pass filters 52-1 through 52-8 are input to the terminals of multipliers 54-1 through 54-8. Multipliers 54-1 through 54-4 form the square of each polarization component of pilot vector $P_2$. Adder 56 forms the quantity $(\vec{P}_2 \cdot \vec{P}_2)$. Multipliers 60-1 through 60-4 form the quantity $(\vec{P}_2 \cdot \vec{P}_2)\vec{P}_1$. Similarly, multipliers 54-5 through 54-8, adder 58, and multipliers 60-5 through 60-8 form the quantity $(\vec{P}_2 \cdot \vec{P}_1)\vec{P}_2$. Subtractors 62-1 through 62-4 then form the four components of weighting vector $W_1$ according to the equation above.

Although weight generator circuit 24 has been described as using pilot signals for generating weights to be applied to the polarization components, it is within the scope of the invention to determine appropriate weights directly from a received data signal $S_1$ or $S_2$. This may be accomplished, for example, by receiving data signal $S_1$ without data signal $S_2$, and determining the weights from the polarization components. Because the polarization components will not include any portion of $S_2$, the weights for $S_1$ can be determined directly. Thus, pilot signals are unnecessary.

The polarization of an optical signal need not be constant across the bandwidth of the signal. That is, different wavelengths of an optical signal may have different polarizations. Accordingly, an illustrative embodiment of the invention involves transmitting several pilot signals of different optical wavelengths for each polarization to determine the signal polarization at each wavelength. In an illustrative embodiment, tapped delay lines equipped with attenuators are used to apply wavelength-dependent weighting to each polarization component of the received optical signal. (Tapped delay lines and their operation are disclosed in R. T. Compton, Jr., *Adaptive Antennas, Concepts and Performance*, Prentice Hall, 1988, Englewood Cliffs, N.J., pp. 120-37, 362-67.) An illustrative arrangement to accomplish this signal design uses coherent reception so that the IF spectrum of FIG. 7 is a frequency translated replica of the optical spectrum.

Figure 6:
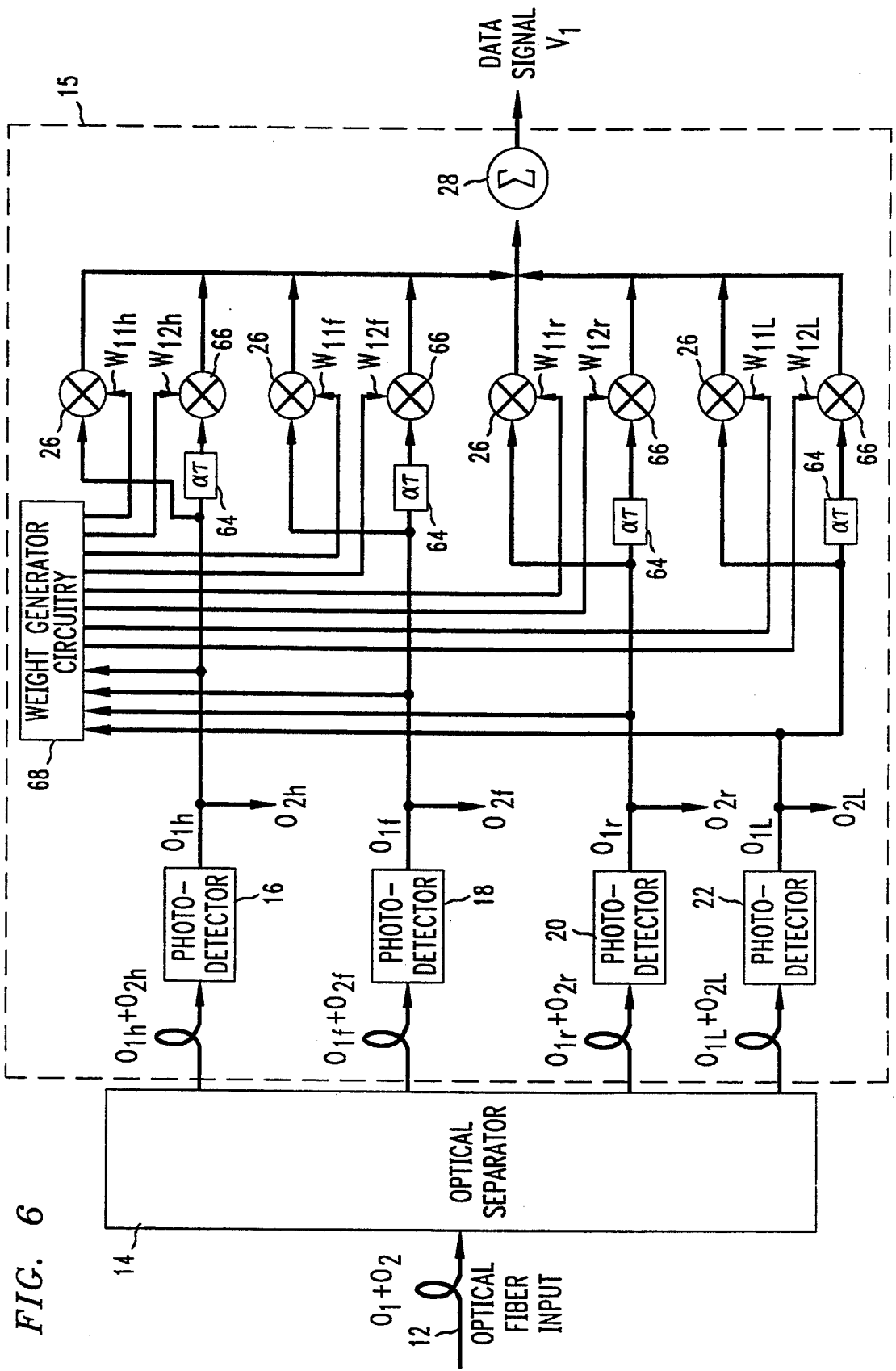
FIG. 6 is a partial block diagram of the apparatus of FIG. 1 showing a tapped delay line circuit for a single polarization.

FIG. 6 shows an alternative embodiment of the receiver arrangement of FIG. 1 in which processing means 15 implements wavelength-variable weighting vectors. For clarity, only a portion of the circuitry is shown, namely, the circuitry for processing optical signal $O_1$. It is to be understood that similar circuitry is provided for processing optical signal $O_2$. In addition to the elements discussed in the description of FIG. 1, the receiver of FIG. 6 includes tapped delay lines 64, attenuators 66, and weight generator circuitry 68. Although FIG. 6 shows only two taps per polarization component, it is to be understood that additional taps may be provided. The delay of the taps are integer multiples of $\alpha T$, where T is the symbol duration and $0 < \alpha \leq 1$.

Photodetectors 16, 18, 20, and 22 each provide to a respective attenuator 26 an electrical signal representing a different polarization component of data signal $S_1$, as described with respect to FIG. 1 above. Photodetectors 16, 18, 20, and 22 also provide the same polarization components to respective attenuators 66 via tapped delay lines 64. Attenuators 26 and 66 apply weights that result in wavelength-dependent weighting of the data signals output from the photodetectors. The weighted electrical signals are combined by adder 28 as previously described. The resulting output signal $V_1$ has minimum cross-talk from the other received polarization and provides polarization as a function of wavelength.

Figure 7:
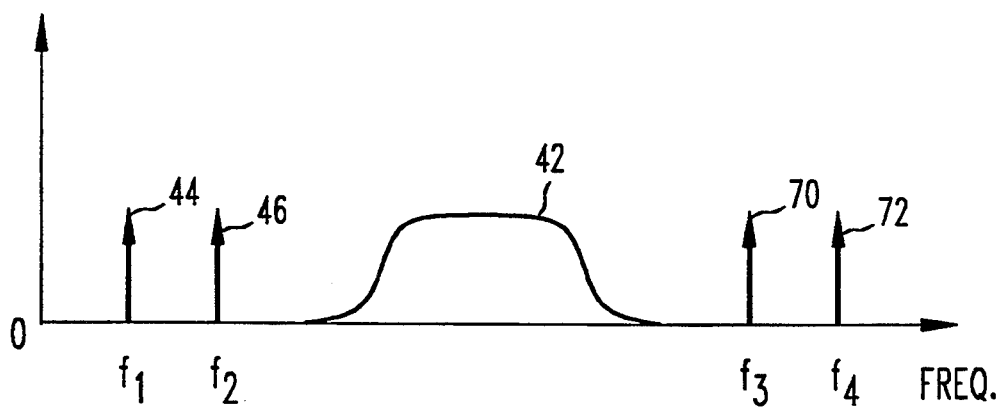
FIG. 7 is a graph of the frequencies of pilot and data signals in an alternative embodiment of the invention.

FIG. 7 shows the low and high frequency pilot signals that are used in conjunction with the tapped delay lines of FIG. 6 to provide wavelength-dependent polarization differentiation. Pilot vectors 44 and 70 are added with data signal $S_1$ to modulate optical signal $O_1$. Weight generator circuitry 68 uses pilot vectors derived from pilot signals 44 and 70 to determine the weights used to generate wavelength-dependent weighting components in a manner similar to that previously described with respect to weight generator circuitry of FIGS. 4 and 5. Pilot signals 46 and 72 are processed to generate wavelength-dependent weighting factors for data signal $S_2$.

The receiver arrangement of the present invention is applicable to both coherent and direct detection systems. For linear processing and weighting to operate properly, the electrical signals output from the photodetectors must be linearly proportional to the optical signals. This can be accomplished in a direct detection system by proper design of $O_1$ and $O_2$ to cause cancelling of the nonlinear components of the electrical signals output from the photodetectors, e.g., by offsetting the carrier frequencies. Although the arrangement has been described in the context of a direct detection system, a local oscillator input (not shown) could be combined with the output of optical separator 14 for coherent detection.

The receiver arrangement of the present invention is well-suited for use in equipment such as repeaters, regenerators, and the like. For example, output signals $V_1$ and $V_2$ of FIG. 1 can be supplied to a respective one of two lasers as part of a regenerator circuit. Other such applications for the principles of the present invention will be apparent in view of this disclosure.

Having isolated two data signals $V_1$ and $V_2$ representative of data signals $S_1$ and $S_2$ from optical signals $O_1$ and $O_2$ in accordance with the present invention, various data processing techniques may be implemented to increase the data transfer capacity of an optical fiber. Techniques for increasing transmission capacity by transmitting two data streams of different polarization include, for example, polarization modulation, polarization switching, dual polarization, and ternary modulation.

Figure 8:
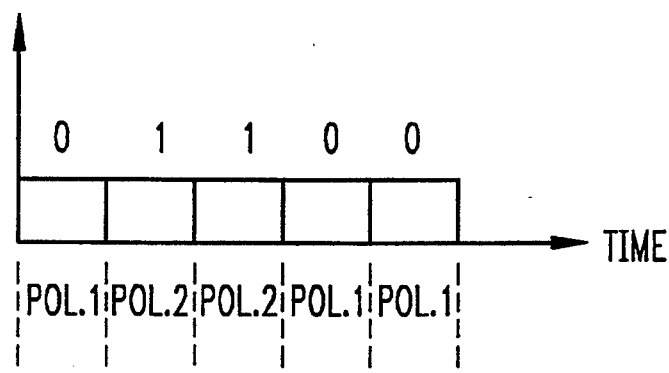
FIG. 8 is an illustrative waveform of data transmitted using polarization modulation.

Polarization modulation involves transmitting data at a constant signal level and switching between two orthogonal polarizations to represent logic 0 and logic 1. Polarization modulation is illustrated by the waveform of FIG. 8. Data bits having a value of logic 0 are transmitted with a first polarization, for example, using optical signal $O_1$. Data bits having a value of logic 1 are transmitted with a second polarization, for example, using optical signal $O_2$. Because polarization modulation maintains constant signal amplitude, amplitude-dependent distortion is minimized. Minimizing amplitude distortion permits data to be transmitted at higher rates, thus increasing transmission capacity.

Figure 9:
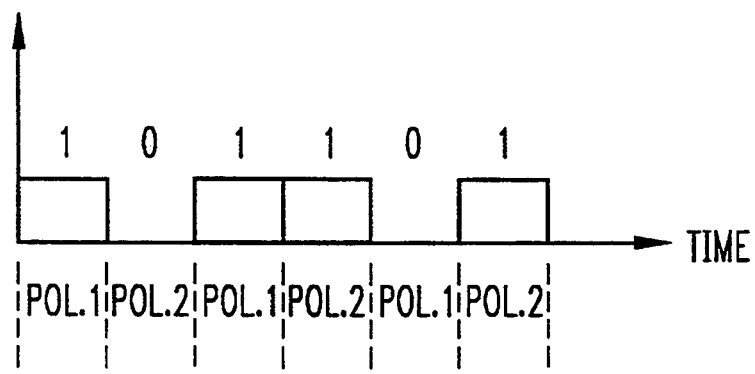
FIG. 9 is an illustrative waveform of data transmitted using polarization switching.

Polarization switching is another method for increasing transmission data rates using multiple polarizations. Polarization switching is illustrated by the waveform of FIG. 9. Polarization switching involves transmitting each successive data bit using a different polarization than that of the previously transmitted data bit.

Figure 10:
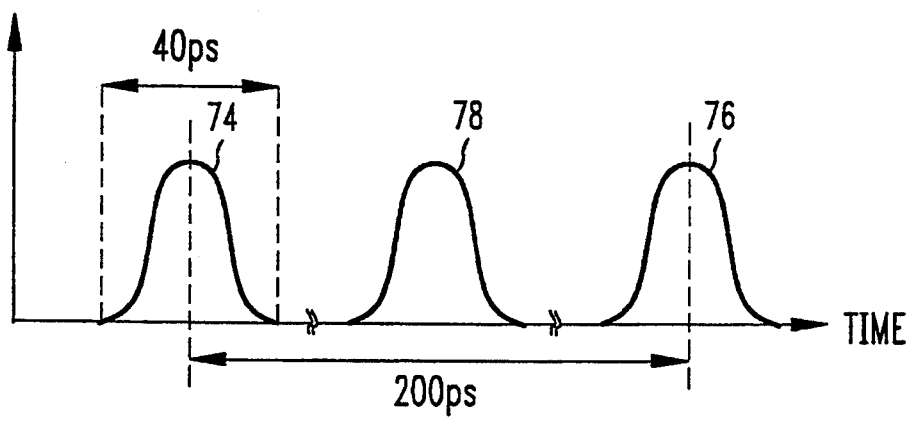
FIG. 10 is an illustrative waveform of solitons transmitted using polarization switching.

Polarization switching is particularly useful in soliton transmission systems because it permits a reduction in the spacing required between successive solitons. Two successive solitons transmitted with a given polarization typically must be spaced apart in time by at least a predetermined threshold period. Solitons spaced apart by less than the predetermined period may interact with each other, possibly resulting in data loss. For example, FIG. 10 shows two soliton pulses 74 and 76 having the same polarization that are spaced apart in time by 200 picoseconds, peak to peak. Reducing the spacing between solitons 74 and 76 causes them to interact with each other. However, soliton 78 can be transmitted with a different polarization (e.g., using optical data signal $O_2$) and spaced apart from solitons 74 and 76 by only 100 picoseconds. Soliton 78 still would be separated by 200 picoseconds from other soliton pulses of the same polarization as soliton 78 to preserve data integrity. Nevertheless, the data rate through the fiber has been doubled in accordance with the principles of the present invention by distinguishing between optical signals of different polarizations.

In nonreturn-to-zero (NRZ) transmission, data pulses are closely spaced. Polarization switching may permit further reductions in NRZ pulse spacing. Transmitting signals of different polarizations may reduce the distortion due to NRZ signal overlap, particularly when the distortion is increased by fiber nonlinearities.

Figure 11:
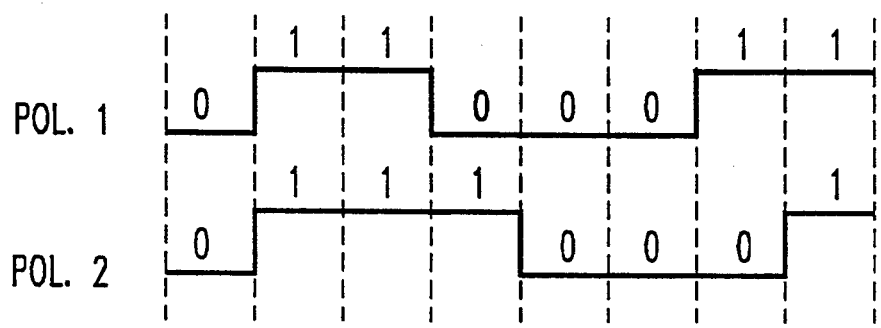
FIG. 11 is an illustrative waveform of data transmitted using dual polarization.

A third method for increasing transmission capacity using the receiver arrangement of the present invention is dual polarization. Dual polarization is the simultaneous transmission of two independent signals of different polarizations to represent independent data. The receiver arrangement of FIG. 1 distinguishes between the two simultaneously transmitted optical signals. Dual polarization transmission is illustrated in FIG. 11. Dual polarization doubles the capacity of NRZ transmission systems without adding distortion commonly caused by increasing the bandwidth. This technique can be used if the distortion (e.g., nonlinearities) in an optical fiber system are sufficiently small to prevent orthogonal polarizations from interacting with each other.

Still another method for increasing transmission capacity using the receiver arrangement of the present invention is ternary modulation. Ternary modulation is described in commonly-owned co-pending U.S. patent application Ser. No. 862,389, filed concurrently herewith, entitled "Ternary Data Communication Using Multiple Polarizations."

It will be understood that the foregoing is merely illustrative of the principles of the invention, and that various modifications can be made by those skilled in the art without departing from the scope and spirit of the invention. For example, although the weight generator circuitry of the present invention has been described in the context of a hardware implementation, it will be apparent to one of ordinary skill in the art in view of this disclosure that the weighting vectors can be implemented in software. For example, a microprocessor can be programmed to calculate appropriate weighting vectors. The scope of this invention is limited only by the claims.

We claim:

1. An apparatus for receiving from a single optical fiber first and second optical signals having different polarizations comprising:

means for separating signals output from the optical fiber into a plurality of different optical polarization components, each of the first and second optical signals comprising at least two different optical polarization components;

means for processing the plurality of optical polarization components to generate first and second output signals in such a way as to recover first and second data signals from the first and second optical signals, respectively, the means for processing comprising:

a plurality of photodetectors, coupled to the separating means, each photodetector converting a different one of the plurality of optical polarization components into a respective one of a plurality of electrical signals; and means for processing the plurality of electrical signals to generate the first and second output signals.

2. The apparatus as defined in claim 1 wherein the separating means separates the signals output from the optical fiber into four different optical polarization components.

3. The apparatus as defined in claim 2 wherein the plurality of optical polarization components comprises:
   a horizontal linear polarization component;
   a 45 degree linear polarization component;
   a right-hand circular polarization component; and
   a left-hand circular polarization component.

4. The apparatus as defined in claim 1 wherein the separating means consists of fixed optical components.

5. The apparatus as defined in claim 1 wherein the processing means comprises means for weighting and combining the plurality of electrical signals to generate the first and second output signals.

6. The apparatus as defined in claim 5 wherein the weighting and combining means comprises means for generating a plurality of weighting signals in response to measured power of a plurality of pilot tones associated with the electrical signals.

7. The apparatus as defined in claim 6 wherein the plurality of weighting signals comprise the following weighting vectors:

$$\vec{W}_1 = (\vec{P}_2 \cdot \vec{P}_2)\vec{P}_1 - (\vec{P}_1 \cdot \vec{P}_2)\vec{P}_2$$

$$\vec{W}_2 = (\vec{P}_1 \cdot \vec{P}_1)\vec{P}_2 - (\vec{P}_1 \cdot \vec{P}_2)\vec{P}_1$$

where
$\vec{P}_1$ = the power of a first pilot signal received at the plurality of photodetectors, represented in vector form; and
$P_2$ = the power of a second pilot signal received at the plurality of photodetectors, represented in vector form.

8. The apparatus as defined in claim 5 wherein the means for weighting and combining weights the plurality of electrical signals as a function of wavelength.

9. The apparatus as defined in claim 8 wherein the means for weighting and combining comprises a tapped delay line.

10. An apparatus comprising:
   means for receiving a plurality of different optical polarization components representing first and second optical signals having different polarizations, each of the first and second optical signals comprising at least two different optical polarization components;
   a plurality of photodetectors, each photodetector converting a different one of the plurality of optical polarization components into a respective one of a plurality of electrical signals; and
   means for processing the plurality of electrical signals in such a way as to recover the first and second optical signals.

11. The apparatus as defined in claim 10 wherein the processing means comprises means for weighting and combining the plurality of electrical signals to generate the first and second output signals.

12. The apparatus as defined in claim 11 wherein the weighting and combining means comprises:
   means for generating a plurality of weighting signals in response to measured power of a plurality of pilot tones associated with the electrical signals.

13. The apparatus as defined in claim 12 wherein the plurality of weighting signals comprise the following weighting vectors:

$$\vec{W}_1 = (\vec{P}_2 \cdot \vec{P}_2)\vec{P}_1 - (\vec{P}_1 \cdot \vec{P}_2)\vec{P}_2$$

$$\vec{W}_2 = (\vec{P}_1 \cdot \vec{P}_1)\vec{P}_2 - (\vec{P}_1 \cdot \vec{P}_2)\vec{P}_1$$

where
$P_1$ = the power of a first pilot signal received at the plurality of photodetectors, represented in vector form; and
$P_2$ = the power of a second pilot signal received at the plurality of photodetectors, represented in vector form.

14. The apparatus as defined in claim 11 wherein the means for weighting and combining weights the plurality of electrical signals as a function of wavelength.

15. The apparatus as defined in claim 14 wherein the means for weighting and combining comprises a tapped delay line.

16. A method for receiving from a single optical fiber first and second optical signals each comprised of a plurality of polarization components and having different polarizations, the method comprising the steps of:
   separating signals output from the optical fiber into a plurality of different optical polarization components;
   converting each of the optical polarization components into an electrical signal; and
   processing the plurality of electrical signals to generate first and second output signals in such a way as to recover first and second data signals from the first and second optical signals, respectively.

17. The method as defined in claim 16 wherein the separating step comprises separating the signals output from the optical fiber into four different optical polarization components.

18. The method as defined in claim 16 wherein the processing step comprises weighting the plurality of electrical signals and combining the weighted signals to generate the first and second output signals.

19. The method as defined in claim 18 wherein the step of weighting and combining comprises weighting the plurality of electrical signals as a function of frequency.

20. The method as defined in claim 18 wherein the step of weighting and combining comprises:
   receiving together with the first and second optical signals a plurality of pilot signals, at least one of the plurality of pilot signals having the same polarization as the first optical signal and at least one of the plurality of pilot signals having the same polarization as the second optical signal;
   separating the plurality of pilot signals into a plurality of optical pilot signal polarization components;
   converting each of the optical pilot signal polarization components into an electrical pilot signal component; and
   combining the electrical pilot signal components to generate the plurality of weighting signals.

21. The method as defined in claim 20 wherein the plurality of weighting signals comprise the following weighting vectors:

$$\vec{W}_1 = (\vec{P}_2 \cdot \vec{P}_2)\vec{P}_1 - (\vec{P}_1 \cdot \vec{P}_2)\vec{P}_2$$

$$\vec{W}_2 = (\vec{P}_1 \cdot \vec{P}_1)\vec{P}_2 - (\vec{P}_1 \cdot \vec{P}_2)\vec{P}_1$$

where
$\vec{P}_1$ = the power of a first pilot signal received at the plurality of photodetectors, represented in vector form; and $\vec{P}_2$ = the power of a second pilot signal received at the plurality of photodetectors, represented in vector form.

22. The method as defined in claim 16 wherein the first and second signals are transmitted using a data transmission technique selected from among the group consisting of dual polarization, polarization switching, and polarization modulation.

* * * * *